US011481487B2

(12) United States Patent
Halcrow et al.

(10) Patent No.: US 11,481,487 B2
(45) Date of Patent: Oct. 25, 2022

(54) SYSTEM AND METHOD OF DETECTING FILE SYSTEM MODIFICATIONS VIA MULTI-LAYER FILE SYSTEM STATE

(71) Applicant: Google LLC, Mountain View, CA (US)

(72) Inventors: Michael Halcrow, Redmond, WA (US); Thomas Garnier, Kirkland, WA (US)

(73) Assignee: Google LLC, Mountain View, CA (US)

(*) Notice: Subject to any disclaimer, the term of this patent is extended or adjusted under 35 U.S.C. 154(b) by 147 days.

(21) Appl. No.: 16/504,464

(22) Filed: Jul. 8, 2019

(65) Prior Publication Data

US 2021/0012000 A1 Jan. 14, 2021

(51) Int. Cl.
*G06F 21/55* (2013.01)
*G06F 16/17* (2019.01)
*G06F 21/56* (2013.01)

(52) U.S. Cl.
CPC ........ *G06F 21/554* (2013.01); *G06F 16/1734* (2019.01); *G06F 21/566* (2013.01)

(58) Field of Classification Search
CPC ......... G06F 21/50–568; G06F 16/1734; H04L 63/12–126; H04L 63/14–1491
See application file for complete search history.

(56) References Cited

U.S. PATENT DOCUMENTS

| 8,695,096 | B1* | 4/2014 | Zhang | G06F 21/564 726/24 |
| 2010/0229169 | A1* | 9/2010 | Bunnell | G06F 9/455 718/1 |
| 2011/0239298 | A1* | 9/2011 | Burtscher | G06F 21/564 726/23 |
| 2015/0007330 | A1* | 1/2015 | Gomez | G06F 21/577 726/25 |
| 2015/0096022 | A1* | 4/2015 | Vincent | G06F 21/562 726/23 |
| 2015/0278521 | A1* | 10/2015 | Klein | H04L 63/145 726/23 |
| 2016/0275287 | A1* | 9/2016 | Wiest | G06F 9/455 |
| 2018/0144134 | A1* | 5/2018 | Liao | G06F 21/566 |
| 2018/0293374 | A1 | 10/2018 | Chen | |
| 2018/0293394 | A1 | 10/2018 | Gunda et al. | |

(Continued)

FOREIGN PATENT DOCUMENTS

CN 109918911 A 6/2019

OTHER PUBLICATIONS

Extended European Search Report for European Patent Application No. 20184737.3 dated Nov. 6, 2020 6 pages.

(Continued)

*Primary Examiner* — Madhuri R Herzog
(74) *Attorney, Agent, or Firm* — Lerner, David, Littenberg, Krumholz & Mentlik, LLP

(57) ABSTRACT

The technology provides for a threat detection system. In this regard, the system may be configured to output file states of a multi-layer file system. For instance, the system may determine, based on the file states for a file, one or more layers of the multi-layer file system in which one or more objects corresponding to the file can be found. Based on the one or more objects corresponding to the file, the system may detect a potential threat. The system may then take an action in response to the potential threat.

20 Claims, 6 Drawing Sheets

(56) References Cited

U.S. PATENT DOCUMENTS

| | | | |
|---|---|---|---|
| 2018/0349150 A1* | 12/2018 | Wong | G06F 9/4493 |
| 2019/0121986 A1 | 4/2019 | Stopel et al. | |
| 2020/0233954 A1* | 7/2020 | Teo | G06F 21/577 |

OTHER PUBLICATIONS

"Aqua Cloud Native Security Platform." © 2019 Aqua Security Software Ltd. 23 pages. Retrieved on May 1, 2019. Retrieved from the Internet: <https://www.aquasec.com/products/aqua-container-security-platform/>.

"Sysdig Secure." Sysdig, Inc. © 2019. 60 pages. Retrieved on May 1, 2019. Retrieved from the Internet: <https://sysdig.com/products/secure/>.

Badot-Bertrand, C. "Auditing containers with osquery." ITNEXT. Jan. 29, 2019. 12 pages. Retrieved on May 1, 2019. Retrieved from the Internet: <https://itnext.io/auditing-containers-with-osquery-389636f8c420>.

Borello, G. "Sysdig and Falco now powered by eBPF." Sysdig, Inc. Feb. 27, 2019. 18 pages. Retrieved on May 1, 2019. Retreived from the Internet: <https://sysdig.com/blog/sysdig-and-falco-now-powered-by-ebpf/>.

Hickman, A. "Container Intrusions: Assessing the Efficacy of Intrusion Detection and Analysis Methods for Linux Container Environments." SANS Institute. Information Security Reading Room. Dec. 29, 2017. 32 pages.

McKinney, A. "Sysdig Introduces eBPF Instrumentation to Extend Cloud-native Visibility and Security to Container-Optimized Linux Platforms." Feb. 27, 2019. Business Wire. San Francisco, CA. 4 pages. Retrieved from the Internet: <https://www.businesswire.com/news/home/20190227005272/en/Sysdig-Introduces-eBPF-Instrumentation-Extend-Cloud-native-Visibility>.

First Examination Report for Indian Patent Application No. 202044028181 dated Jul. 1, 2021. 6 pages.

* cited by examiner

SYSTEM AND METHOD OF DETECTING FILE SYSTEM MODIFICATIONS VIA MULTI-LAYER FILE SYSTEM STATE

BACKGROUND

Typical methods of detecting threats in an operating system's ("OS") file system may include comparing modification timestamps for a file in the OS and comparing files to an index of expected files in the OS. However, these methods require original timestamps and/or original indexes in an OS to be made available to the detection mechanism, which may expose the OS to further threats and require additional storage and processing. Another method of detecting threats in an OS file system is to measure file contents in the OS, which may require a large amount of processing resources, such as handling and processing a large amount of input/output file data. Yet another example of a threat detection method in an OS file system is to profile disk block allocation maps for the OS, which may be highly complex and may not be a good indicator of malicious modification.

Further, detecting threats in a containerized environment poses additional challenges as a result of the ephemeral nature of containers. In this regard, a base image of an OS file system including a set of one or more executable binaries, which are compiled programs used to run one set of instances of containers, may be created. It is generally accepted practice to create a new base image of the OS file system with modified or new set of executable binaries when the executable binaries need to be modified, removed, added, etc. New instances of containers may then be deployed using the new base image. It is typically against accepted practice to modify the set of executable binaries in the containers while the containers are running, as any modifications made to the executable binaries during a container instance do not persist beyond the relatively short life of that container instance. As such, if a malicious actor modifies the executable binaries or adds new ones during runtime of a container instance, the malicious modification may not be detectable once the life of the container instance is over.

BRIEF SUMMARY

The present disclosure relates to detecting potential threats in a multi-layer file system. One aspect includes a method comprising outputting file states for a file. Based on the file states for one or more layers of a multi-layer file system in which one or more objects corresponding to the file can be found may be determined. A potential threat to the multi-layer file system may be determined based on the one or more layers in which the one or more objects corresponding to the file are found and an action may be taken in response to the potential threat.

In some instances, the method may include determining that an object corresponding to the file found in a modifiable image in an upper layer of the multi-layer file system contains modifications to an object corresponding to the file found in a base image in a lower layer of the multi-layer file system, and detecting the potential threat may be further based on determining that the object corresponding to the file found in the modifiable image contains modifications to the object corresponding to the file found in the base image.

In some instances, the method may include determining that none of the one or more objects corresponding to the file is found in a base image in a lower layer of the multi-layer file system, and detecting the potential threat may be further based on determining that none of the one or more objects corresponding to the file is found in the base image.

In some examples, a base image may be created and detecting the potential threat may be further based on determining that the file states indicate that the file was created after the base image.

In some examples one or more modifiable images may be constructed in an upper layer of the multi-layer file system so that the one or more modifiable images contain modifications to the base image made during a runtime of an application. Detecting the potential threat may be further based on determining that the file states indicate that the file was created during the runtime of the application.

In some examples, one or more modifiable images may be constructed in an upper layer of the multi-layer file system so that the one or more modifiable images contain modifications to the base image made during an instance of a container running an application. The potential threat may be detected further based on determining that the file states indicate that the file was created during the instance of container.

In some instances, the method may include determining whether the file is an executable binary. Detecting the potential threat may be further based on determining that the file is an executable binary.

In some instances, the method may include determining whether the file is a library file. Detecting the potential threat may be further based on determining that the file is a library file.

In some instances, the method may include determining whether the file is a script. Detecting the potential threat may be further based on determining that the file is a script.

In some instances, the method may include determining whether a process involving the file causes a usage of processing resources to meet a threshold value. Detecting the potential threat may be further based on determining that the usage of processing resources meeting the threshold value.

In some instances, the method may include determining whether the file is stored in a hard disk. Detecting the potential threat may be further based on the file not being stored in a hard disk.

In some instances, taking an action in response to the potential threat may include generating a notification based on the potential threat and outputting the notification to a user interface.

In some instances, the method may include assigning a first confidence score to the potential threat based on the determination based on the file states; assigning one or more additional confidence scores to the potential threat based on one or more additional factors indicative of a threat; and determining that a total confidence score including the first confidence score and the one or more additional confidence scores meets a threshold level. Generating the notification may be further based on the total confidence score meeting the threshold level.

In some instances, the method may include determining a type of the potential threat. The notification may further include the type of the potential threat.

In some instances, the method may include identifying a container in which the potential threat is detected. The notification may include an identity of the container.

Another aspect is directed to a distributed computing system, comprising one or more processors. The one or more processors may be configured to provide a guest operating system (OS). The guest OS may be configured to: output file states for a file as events; provide a threat detection service. The threat detection service may be configured to: receive the events including the file states; determine, based on the file states for the file, one or more layers of a multi-layer file system in which one or more objects corresponding to the file can be found; detect a potential threat to the multi-layer file system based on the one or more objects corresponding to the file; and generate findings on the potential threat.

In some instances, the threat detection service may be further configured to: determine that none of the one or more objects corresponding to the file is found in a base image in a lower layer of the multi-layer file system. Detecting the potential threat may be further based on determining that none of the one or more objects corresponding to the file is found in the base image.

In some instances, the threat detection service may be further configured to: determine that an object corresponding to the file found in a modifiable image in an upper layer of the multi-layer file system contains modifications to an object corresponding to the file found in a base image in an upper layer of the multi-layer file system. Detecting the potential threat may be further based on determining that the object corresponding to the file found in the modifiable image contains modifications to the object corresponding to the file found in the base image.

In some instances, the threat detection service may include a plurality of detectors, the plurality of detectors each configured to analyze events involving a specific type of file.

In some instances, the one or more processors may be further configured to: provide a security center, the security center configured to: receive, from the threat detection service, the findings on the potential threat; and generate a notification based on the findings.

DETAILED DESCRIPTION

Overview

Figure 1:
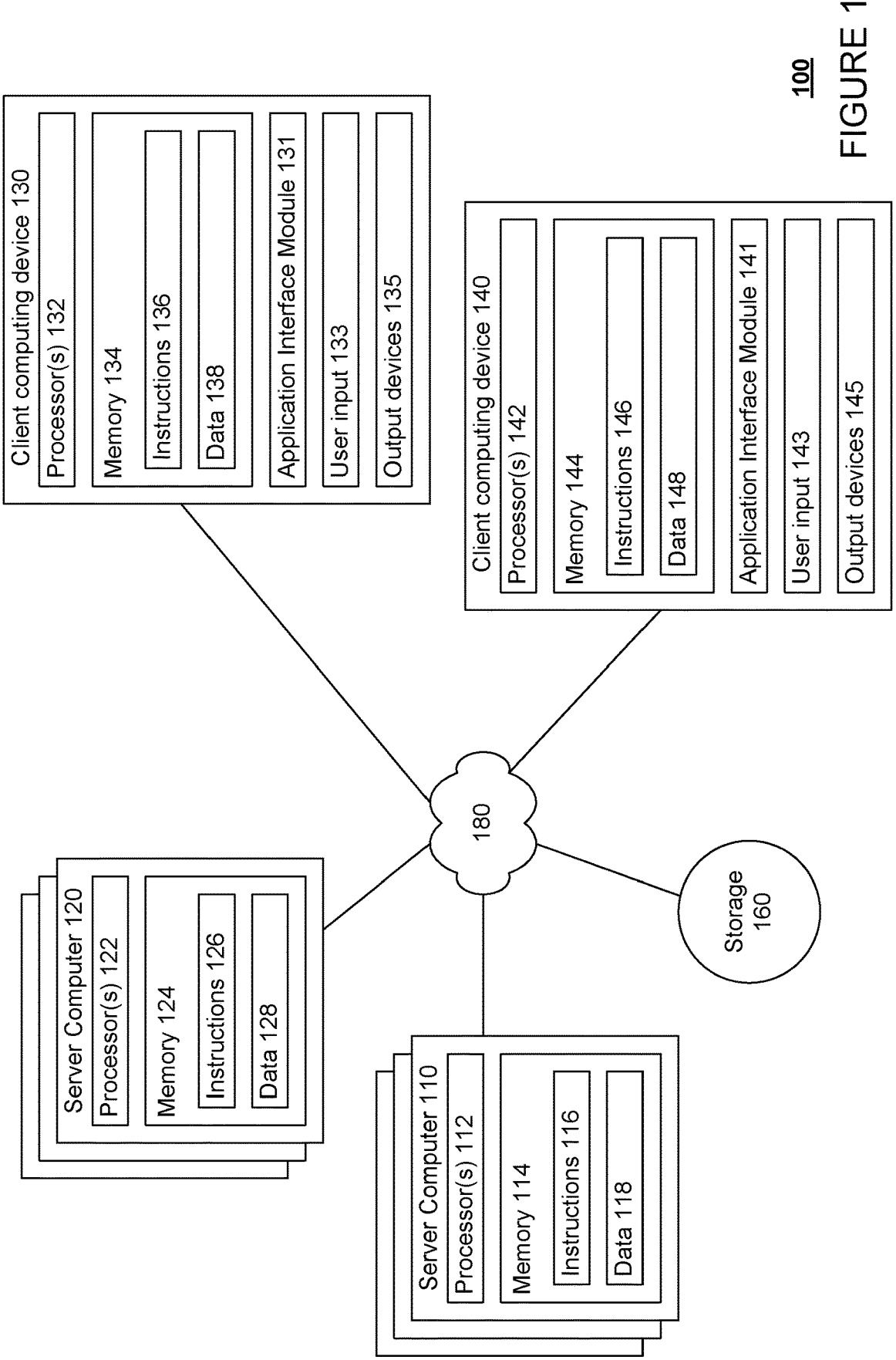
FIG. 1 is a block diagram illustrating an example distributed system in accordance with aspects of the disclosure.

The technology generally relates to detecting threats in an operating system ("OS") with a multi-layer file system executing a containerized environment. To address the issues of known threat detection techniques described above, aspects of a multi-layer OS file system executing the containerized environment may be leveraged. In this regard, a multi-layer OS file system may allow a base image of the OS file system to be created with a set of objects in a lower layer and one or more modifiable images of the OS file system may be constructed in an upper layer with newly allocated memory space for a corresponding set of objects.

The multi-layer OS file system may be a copy-on-write system such that modifications cannot be written to the objects in the base image, rather, modifications to the base image are written to the newly allocated memory space in the corresponding objects in the one or more modifiable images. Further, access of a file in such a multi-layer OS file system may be performed from top down. For instance, contents in an object corresponding to the file in the one or more modifiable images in an upper layer are read first, followed by contents in an object corresponding to the file in the base image in a lower layer. Thus, the modifiable images contain modifications relative to the base image. These modifications may be made during runtime of an instance of a container and may be detected. The detection of modifications and/or additional objects including new or modified executable binaries, library files, or scripts may be indicative of a potential threat.

A threat detection system may be implemented on a distributed system. For example, the distributed system may be a cloud computing system hosting various virtualized environments such as virtual machines and virtual OS's as "guests," where the guest OS may be configured to run a multi-layer copy-on-write file system described above. As examples, the OS may be a Linux OS, a cloud-based OS, a container-optimized OS, etc. In this threat detection system, the guest OS may be configured to output file states of the OS multi-layer file system. For instance, a kernel of the OS may be configured to output file states of the multi-layer OS file system. For instance, when a process is executed involving a file, one or more security modules of the kernel may be configured to output file states related to the file. For example, the file states may identify layers of the multi-layer OS file system in which objects corresponding to the file may be found. Further, a privileged user-mode process may be provided in the OS to receive the file states from the kernel, and output events including the file states.

The threat detection system may include additional components, such as services provided by the host distributed system. The threat detection system may include a threat detection service that receives, from the OS, events, such as process execution events, memory execution events, or memory mapping events. The events may include the file states of the OS multi-layer file system. The threat detection system may parse the file states for potential threats. A detector manager of the threat detection service may receive the events including the file states, reference to the container performing the event, the process performing the event, the parents, etc., from a streaming proxy of a privileged user-mode process in the OS. Based on the file states, the detector manager may be configured to determine, for example, that when objects corresponding to an executable binary file are found only in the upper layer and not in the lower layer, the executable binary is a new executable binary that was created after the creation of the base image, and thus may be indicative of a potential threat. As another example, the detector manager may be configured to determine that when an object corresponding to an executable binary file found in the upper layer contains modifications which are not present in the executable binary of the base image, then the executable binary has been modified after creation of the base image, and thus may be indicative of a potential threat. Similar determinations may also be made for files that are library files, scripts, etc.

The detector manager may include a plurality of detectors configured to determine whether certain events are indicative of a potential threat. For instance, each detector may be configured to determine whether events for a specific type of file are indicative of a potential threat. As an example, a first detector for a first type of executable binary may analyze events involving executable binaries of the first type, and determine whether any of these executable binaries have objects only found in the upper layer of the multi-layer OS file system. As another example, a second detector for a second type of executable binary may be configured to analyze events involving executable binaries of the second type, and determine whether any of these executable binaries were modified into a reverse shell. A reverse shell may control a virtual machine running an application to communicate with another machine, such as by sending user data from the application to a listener port of the other machine. The detector manager may also consider additional factors in determining whether a potential threat exists, such as excessive CPU or GPU usage.

An action may be taken in response to determining that an event is indicative of a potential threat. For example, upon determining that an event is indicative of a potential threat, the detector manager may generate findings on the potential threat. For example, the findings may include a type of threat, such as a suspicious binary execution or a reverse shell. As another example, the findings may include a location of threat, such as a specific container where the new or modified file is found. As still another example, the findings may include instructions on how to handle the threat.

In some instances, an action taken in response to the detection of a potential threat may include generating a notification. The notification may be provided to a user to alert the user of the potential threat. For instance, the threat detection service may send the findings on the detected potential threats to a security center. The security center, or other portion of the threat detection system, may determine whether and when to generate, or trigger the generation of notifications of the potential threats. In some instances the notification may include the findings on the potential threat, such as the type of threat, the location of the threat, and/or how to handle the threat. The notifications may be texts, emails, logs, graphics, audio, haptic feedback, etc.

The technology is advantageous because it provides a reliable and fast method for detecting threats to an OS in a containerized environment. By comparing OS file system images during runtime, early detection of threats may be possible, and the threats may be detected even though the malicious modifications may be ephemeral. Further, since comparisons of the states of the file system do not involve handling and processing I/O data or profiling disk block allocation maps, the method is lightweight and fast.

Example Systems

FIG. 1 is a functional diagram showing an example distributed system 100. As shown, the system 100 may include a number of computing devices, such as server computers 110, 120 coupled to a network 180. For instance, the server computers 110, 120 may be part of a cloud computing system. The system 100 may also include one or more client computing devices, such as client computing devices 130 and 140 capable of communication with the server computers 110, 120 over the network 180.

As shown, the server computer 110 may contain one or more processor 112, memory 114, and other components typically present in general purpose computers. The memory 114 can store information accessible by the processors 112, including instructions 116 that can be executed by the processors 112. Memory can also include data 118 that can be retrieved, manipulated or stored by the processors 112. The memory 114 may be a type of non-transitory computer readable medium capable of storing information accessible by the processors 112, such as a hard-drive, solid state drive, tape drive, optical storage, memory card, ROM, RAM, DVD, CD-ROM, write-capable, and read-only memories. The processors 112 can be a well-known processor or other lesser-known types of processors. Alternatively, the processor 112 can be a dedicated controller such as an ASIC.

The instructions 116 can be a set of instructions executed directly, such as computing device code, or indirectly, such as scripts, by the processors 112. In this regard, the terms "instructions," "steps" and "programs" can be used interchangeably herein. The instructions 116 can be stored in object code format for direct processing by the processors 112, or other types of computer language including scripts or collections of independent source code modules that are interpreted on demand or compiled in advance. Functions, methods, and routines of the instructions are explained in more detail in the foregoing examples and the example methods below. The instructions 116 may include any of the example features described herein.

The data 118 can be retrieved, stored or modified by the processors 112 in accordance with the instructions 116. For instance, although the system and method is not limited by a particular data structure, the data 118 can be stored in computer registers, in a relational database as a table having a plurality of different fields and records, or XML documents. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processors 112 and memory 114 as being within the same block, the processors 112 and memory 114 may actually include multiple processors and memories that may or may not be stored within the same physical housing. For example, some of the instructions 116 and data 118 can be stored on a removable CD-ROM and others within a read-only computer chip. Some or all of the instructions and data can be stored in a location physically remote from, yet still accessible by, the processors 112. Similarly, the processors 112 can include a collection of processors that may or may not operate in parallel. Server computer 120 may be configured similarly as server computer 110, with processors 122, memory 124, instructions 126, data 128, etc. The server computer 110, 120 may each include one or more internal clocks providing timing information, which can be used for time measurement for operations and programs run by the server computers 110, 120.

The server computers 110, 120 may be positioned a considerable distance from one another. For example, the server computers may be positioned in various countries around the world. The server computers 110, 120 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. In some examples, the server computers 110, 120 may be virtualized environments.

Server computers 110, 120, and client computing devices 130, 140 may each be at one node of network 180 and capable of directly and indirectly communicating with other nodes of the network 180. For example, the server computers 110, 120 can include a web server that may be capable of communicating with client computing device 130 via network 180 such that it uses the network 180 to transmit information to an application running on the client computing device 130. Server computers 110, 120 may also be computers in a load balanced server farm, which may exchange information with different nodes of the network 180 for the purpose of receiving, processing and transmitting data to client computing devices 130, 140. Although only a few server computers 110, 120 are depicted in FIG. 1, it should be appreciated that a typical system can include a large number of connected server computers with each being at a different node of the network 180.

The client computing devices 130, 140 may also be configured similarly to server computers 110, 120, with processors 132, 142, memories 134, 144, instructions 136, 146, and data 138, 148. The client computing devices 130, 140 may have all of the components normally used in connection with a personal computing device such as a central processing unit (CPU), memory (e.g., RAM and internal hard drives) storing data and instructions, input and/or output devices, sensors, clock, etc. Client computing devices 130, 140 may comprise a full-sized personal computing device, they may alternatively comprise mobile computing devices capable of wirelessly exchanging data with a server over a network such as the Internet. For instance, client computing devices 130, 140 may be a desktop or a laptop computer, or a mobile phone or a device such as a wireless-enabled PDA, a tablet PC, or a netbook that is capable of obtaining information via the Internet, or a wearable computing device, etc.

The client computing devices 130, 140 may include an application interface module 131, 141. The application interface module 131, 141 may be used to access a service made available by one or more server computers, such as server computers 110, 120. The application interface module 131, 141 may include subroutines, data structures, object classes and other type of software components used to allow servers and clients to communicate with each other. In one aspect, the application interface module 131, 141 may be a software module operable in conjunction with several types of operating systems known in the arts. Memory 134, 144 may store data 138, 148 accessed by the application interface module 131, 141. The data 138, 148 can also be stored on a removable medium such as a disk, tape, SD Card or CD-ROM, which can be connected to client computing devices 130, 140.

Further as shown in FIG. 1, client computing devices 130, 140 may include one or more user inputs 133, 143, such as keyboard, mouse, mechanical actuators, soft actuators, touchscreens, microphones, sensors, and/or other components. The client computing devices 130, 140 may include one or more output devices 135, 145, such as a user display, a touchscreen, one or more speakers, transducers or other audio outputs, a haptic interface or other tactile feedback that provides non-visual and non-audible information to the user. Although only a few client computing devices 130, 140 are depicted in FIG. 1, it should be appreciated that the system can include a large number of client computing devices with each being at a different node of the network 180.

As with memory 114, storage system 160 can be of any type of computerized storage capable of storing information accessible by one or more of the server computers 110, 120, and client computing devices 130, 140, such as a hard-drive, memory card, ROM, RAM, DVD, CD-ROM, write-capable, and read-only memories. In addition, storage system 160 may include a distributed storage system where data is stored on a plurality of different storage devices which may be physically located at the same or different geographic locations. Storage system 160 may be connected to computing devices via the network 180 as shown in FIG. 1 and/or may be directly connected to any of the server computers 110, 120, and client computing devices 130, 140.

Server computers 110, 120, and client computing devices 130, 140 can be capable of direct and indirect communication such as over network 180. For example, using an Internet socket, the client computing device 130 can connect to a service operating on remote server computers 110, 120 through an Internet protocol suite. Server computers 110, 120 can set up listening sockets that may accept an initiating connection for sending and receiving information. The network 180, and intervening nodes, may include various configurations and protocols including the Internet, World Wide Web, intranets, virtual private networks, wide area networks, local networks, private networks using communication protocols proprietary to one or more companies, Ethernet, WiFi (for instance, 802.81, 802.81b, g, n, or other such standards), and HTTP, and various combinations of the foregoing. Such communication may be facilitated by a device capable of transmitting data to and from other computers, such as modems (for instance, dial-up, cable or fiber optic) and wireless interfaces.

Figure 2:
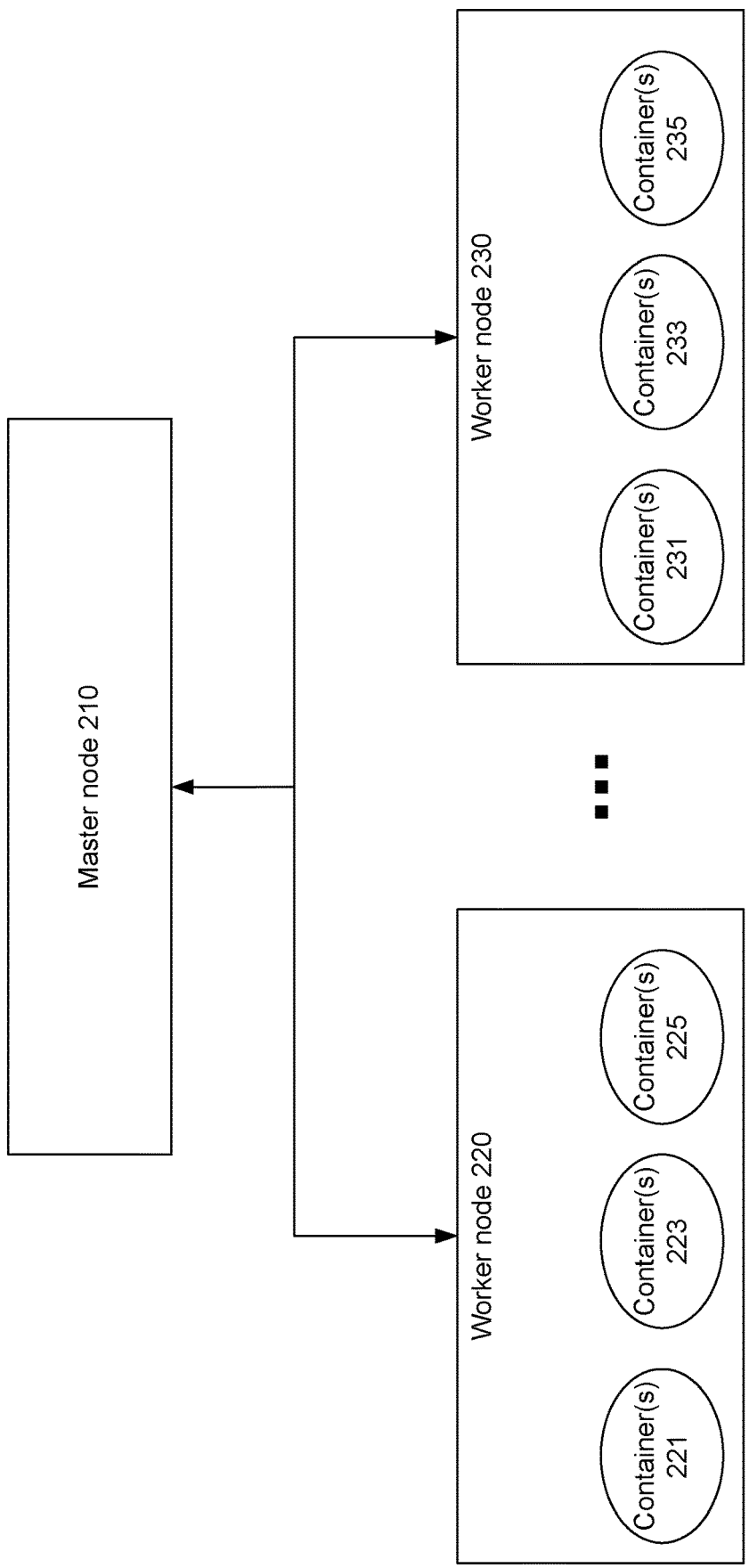
FIG. 2 is a block diagram illustrating an example containerized environment in accordance with aspects of the disclosure.

To efficiently use the processing and/or storage resources in a distributed system such as the distributed system 100, applications may be implemented using a containerized environment. FIG. 2 is a functional diagram illustrating an example containerized environment. The containerized environment may be configured to package various services of an application into containers based on configuration data. The containers may then be deployed on a distributed or cloud computing system, for example for execution by processors 112, 122 (FIG. 1) of server computers 110, 120, and/or on client computing devices 130, 140, for example for execution by processors 132, 142. The containerized environment may be configured to allocate resources for the containers, load balance services provided by the containers, and scale the containers (such as by replication and deletion).

As shown in FIG. 2, the containerized environment may be configured as a cluster 200. As shown, the cluster 200 may include a master node 210 and a plurality of worker nodes, such as worker node 220 and worker node 230. Each node of the cluster 200 may be running on a physical machine or a virtual machine. The master node 210 may control the worker nodes 220, 230. Containers may be deployed on these worker nodes 220, 230, for example, the containers may include computer code and program runtimes that form part of the application.

The containers may be deployed in any of a number of ways. A single instance of a container including one set of code and/or program runtimes may be deployed on a single node. For example, container 221 may include one set of code and/or program runtimes deployed as a single instance on node 220. Alternatively, multiple instances of the same or different container may be deployed on a single node. For example, containers 221 and 223 may be two instances of a same container including the same set of code and/or program runtimes deployed on node 220. As still another alternative, multiple instances of the same container may be deployed on multiple nodes. For example, containers 221 and 231 may be two instances of a same container including the same set of code and/or program runtimes deployed respectively on nodes 220 and 230. In addition to instances of containers including the same code/program runtimes, other instances of other containers may also be deployed. For example, container 221 and container 223 may be instances of two different containers having different code and/or program runtimes. The containers may be further organized into one or more container groups.

The master node 210 may be configured to manage resources of the worker nodes 220, 230. The master node 210 may configure and/or update objects in the master node 210. For example, the objects may include information on containers, container groups, replication components, etc. The master node 210 may be configured to be notified of changes in the states of various items in the cluster 200, and update objects in the master node 210 based on the changes. As such, the master node 210 may be configured to store configuration data for the cluster 200, which may be an indication of the overall state of the cluster 200. The configuration data may also include desired state(s) for the cluster 200, which for example may be provided by a user. As an example, desired states may be coordinates for a destination to be reached by a robot controlled by the application.

The master node 210 may be configured to run control loops to drive the cluster 200 towards the desired state(s). In this regard, the master node 210 may watch state(s) shared by nodes of the cluster 200 and make changes attempting to move the current state towards the desired state(s). In this regard, the master node 210 may be configured to perform any of a number of management functions, including managing nodes (such as initializing nodes, obtain information on nodes, checking on unresponsive nodes, etc.), managing replications of containers and container groups, etc.

The master node 210 may be configured to track resource use on each worker node to ensure that workload is not scheduled in excess of available resources. For this purpose, the master node 210 may be provided with the resource requirements, resource availability, and other user-provided constraints and policy directives such as quality-of-service, affinity/anti-affinity requirements, data locality, and so on. As such, the master node 210 may match resource supply to workload demand.

The master node 210 may be configured to communicate with the worker nodes 220, 230. For example, the master node 210 may be configured to ensure that the configuration data in the master node 210 matches that of containers in the worker nodes 220, 230, such as containers 221, 223, 225, 231, 233, 235. The worker nodes 220, 230 may be configured to start, stop, and/or maintain the containers based on the instructions from the master node 210. The worker nodes 220, 230 may be configured to manage routing and streaming (such as TCP, UDP, SCTP), such as via a network or other communication channels.

Although only one master node 210 is shown, the cluster 200 may additionally include a plurality of master nodes. For example, the master node 210 may be replicated to generate a plurality of master nodes. The plurality of master nodes may improve performance of the cluster by continuing to manage the cluster even when one or more master nodes may fail. In some examples, the plurality of master nodes may be distributed onto different physical and/or virtual machines.

To run an application in a containerized environment, such as the containerized environment of FIG. 2, multiple nodes and containers may need to run simultaneously on an OS file system. As such, during runtime the multiple nodes and containers may attempt to make potentially conflicting modifications to the OS file system. To avoid such conflicting modifications, a multi-layer OS file system may be provided to implement a containerized environment so that the multi-layer OS file system allows the nodes and containers to run simultaneously, but does not allow the nodes and containers to make potentially conflicting modifications. The multi-layer OS file system may allow a non-modifiable base image of the OS file system to be created in a non-modifiable lower layer, and one or more modifiable images of the OS file system to be created in a modifiable upper layer, where modifications may be written into.

Figure 3:
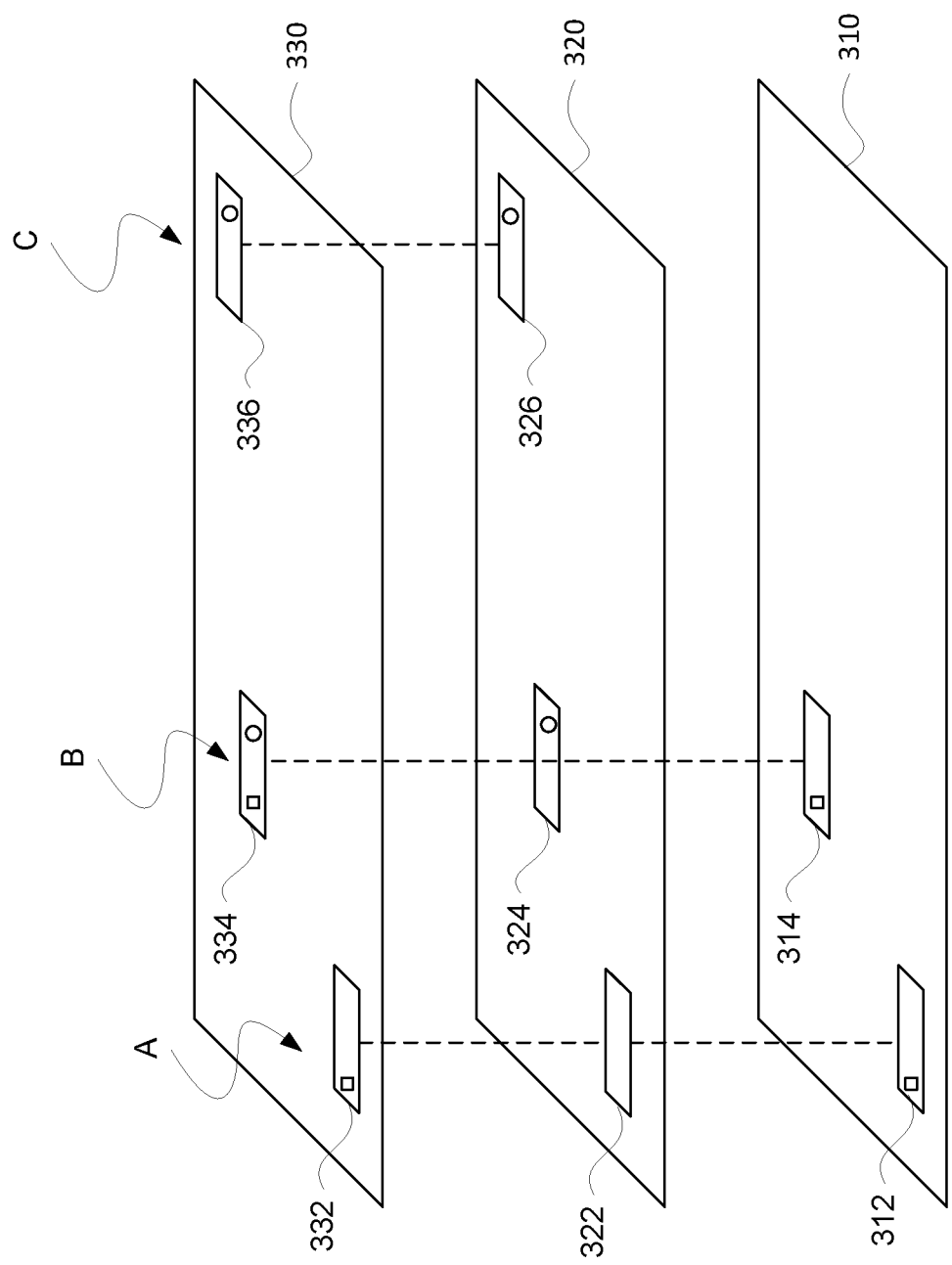
FIG. 3 is a block diagram illustrating an example multi-layer file system in accordance with aspects of the disclosure.

FIG. 3 is a functional diagram illustrating an example multi-layer OS file system 300, which can execute a containerized environment such as the containerized environment shown in FIG. 2. For example, the multi-layer OS file system 300 may be provided on memories 114, 124 of server computers 110, 120, or memories 134, 144 of client computing devices 130, 140. The multi-layer OS file system 300 may be built into an OS, such as in the kernel of the OS. Privileged user-mode processes may be allowed to configure the kernel of the OS in order to use the multi-layer OS file system. A privileged user-mode process may configure the kernel by indicating where each layer of the multi-layer OS file system is to be stored, such as by specifying a "mounting path" in one or more memories. In this regard, files in the multi-layer OS system 300 (such as content and metadata of the files) may be stored in any memory including hard disk or any ephemeral file system such as tmpfs, while information on the structure of the multi-layer OS file system 300 (such as mounting paths) may be stored in memory associated with the kernel.

Referring to FIG. 3, the multi-layer OS file system 300 has a lower layer 310. As mentioned above, a mounting path for the lower layer 310 may be configured by one or more user-mode processes, and stored in memory associated with a kernel of an OS that provides the multi-layer OS file system 300. For example, the mounting path may include memory addresses for the lower layer 310. The lower layer 310 may include objects in a base image, such as objects 312, 314 shown. The objects may correspond to files, such as data files, executable binaries, scripts, etc. For example, object 312 may correspond to a file A, while object 314 may correspond to a file B. As an example scenario, a user may input configuration data including a set of files needed for one instance of containers to run an application. The set of files may include a set of executable binaries, a set of library files, a set of scripts, etc. Based on the configuration data, a base image of an OS file system may be generated. The base image may include the set of files specified by the user (instead of all files available in the OS system). Alternatively, the user may provide, such as by upload, the base image, including the set of files, to be used by one set of instances of containers running an application. During runtime, the instances of containers running the application may share this base image, but may not be allowed to modify this base image. Later, the user may input new configuration data or provide a new base image for another set of instances of containers to run the application.

As described above in relation to FIG. 2, a container may be deployed in many ways, for example as one or more instances, on one or more nodes, etc. As such, one base image may be created and linked to each of the instances of the container deployed, whether these instances are deployed on the same node or different nodes. The base image may also be linked to instances of other deployed containers. If different files are needed, a new base image may be created with new or modified set of files, and new instances of containers may be deployed and linked to the new base image.

To make modifications, such as writing or editing, during runtime, the multi-layer OS file system 300 may have a copy-on-write file system structure. For example as shown, the multi-layer OS file system 300 has an upper layer 320 that is modifiable. Similar to the lower layer 310, a mounting path for the upper layer 320 may be configured by one or more user-mode processes, and stored in memory associated with a kernel of an OS that provides the multi-layer OS file system 300. For example, the mounting path of the upper layer 320 may include memory addresses that differ from the mounting path of the lower layer 310. The upper layer 320 may include one or more modifiable images, each of which may be initialized with objects corresponding to the objects in the base image. For example, FIG. 3 shows one modifiable image initialized with object 322 corresponding to object 312, and object 324 corresponding to object 314. The objects in the upper layer 320 may be empty when first initialized. However, during runtime, instead of overwriting contents in the objects in the lower layer 310, modifications may be written in newly allocated memory space in the corresponding object in the upper layer 320. For example, during runtime a container may modify object 324 in the upper layer 320 (the modification to object 324 being illustrated as a circle) corresponding to object 314 of the lower layer 310.

Referring again to the various ways to deploy instances of containers described with relation to FIG. 2, modifiable images may be linked to these instances of containers. A modifiable image may be created and linked to each instance of container so that each instance may make changes to its respective modifiable image. For example, a modifiable image may be initialized based on a same base image, and thus objects corresponding to same set of files. Each of these modifiable images may be linked to a respective instance of containers deployed. Thus, each instance of container may have a different multi-layer representation, such as linked to same base image but to different modifiable images. During runtime, the deployed instances of containers may make modifications to their respective modifiable images. As described above, a new base image may be created if new files are needed, based on which new modifiable images may then be created. New instances of containers may then be deployed and linked to these new modifiable images.

Such an overlay structure allows containers to make runtime modifications, such as write operations, to the OS file system without manipulating the lower base image, rather, the modifications end up in the modifiable images of the upper layer. Thus, the multi-layer OS file system allows multiple containers to run simultaneously on top of a same base image without allowing the multiple containers to make potentially-conflicting modifications to that base image. Further, by sharing the same base image, overall disk utilization can be reduced and memory can be more efficiently allocated.

File access, such as reading, in the multi-layer OS file system 300 may occur by first retrieving modified portions of a file from the upper layer 320, and then unmodified portions of the file from the lower layer 310. This is illustrated in FIG. 3 by the overlay 330. For example, to read file B, modified portions from the object 324 (illustrated as a circle) in the upper layer 320 is retrieved, and unmodified portions from the object 314 (illustrated as a square) in the lower layer 310 are retrieved). The unmodified portions from object 314 and the modified portions of object 324 together result in the contents shown in object 334 of the overlay 330. Likewise, to read file A, since object 322 is empty, only unmodified portions from the object 312 in the lower layer 310 (illustrated as a square) is retrieved, resulting in contents shown in object 332 of the overlay 330. To read file C, since there is no corresponding object in the lower layer 310, only new portions from the object 326 in the upper layer 320 (illustrated as a circle) are retrieved, resulting in object 336 of overlay 330.

As mentioned herein, due to the ephemeral nature of containers, modifications to the multi-layer OS file system 300 during runtime would rarely if ever involve adding or modifying certain files such as executable binaries, library files, and scripts. Rather, new base images are typically created when new or modified executable binaries, library files, library files, or scripts are required to run container instances. Thus, if file C is an executable binary, library file, or script, the fact that object 326 in the upper layer 320 does not have a corresponding object in the lower layer 310 indicates that file C may be newly added, which may be indicative of suspicious activity. As another example, if file B is an executable binary, library file, or script, the modification to file B made in object 324 may be indicative of suspicious activity.

As such, an OS running a multi-layer OS file system may be configured to leverage these aspects of the multi-layer OS file system to output file states which may be used to detect potential threats in the multi-layer OS file system. Using the multi-layer OS file system during runtime, early detection of threats may be possible, and the threats may be detected even though the malicious modifications in an instance of a container may be ephemeral, or otherwise short lived.

Figure 4:
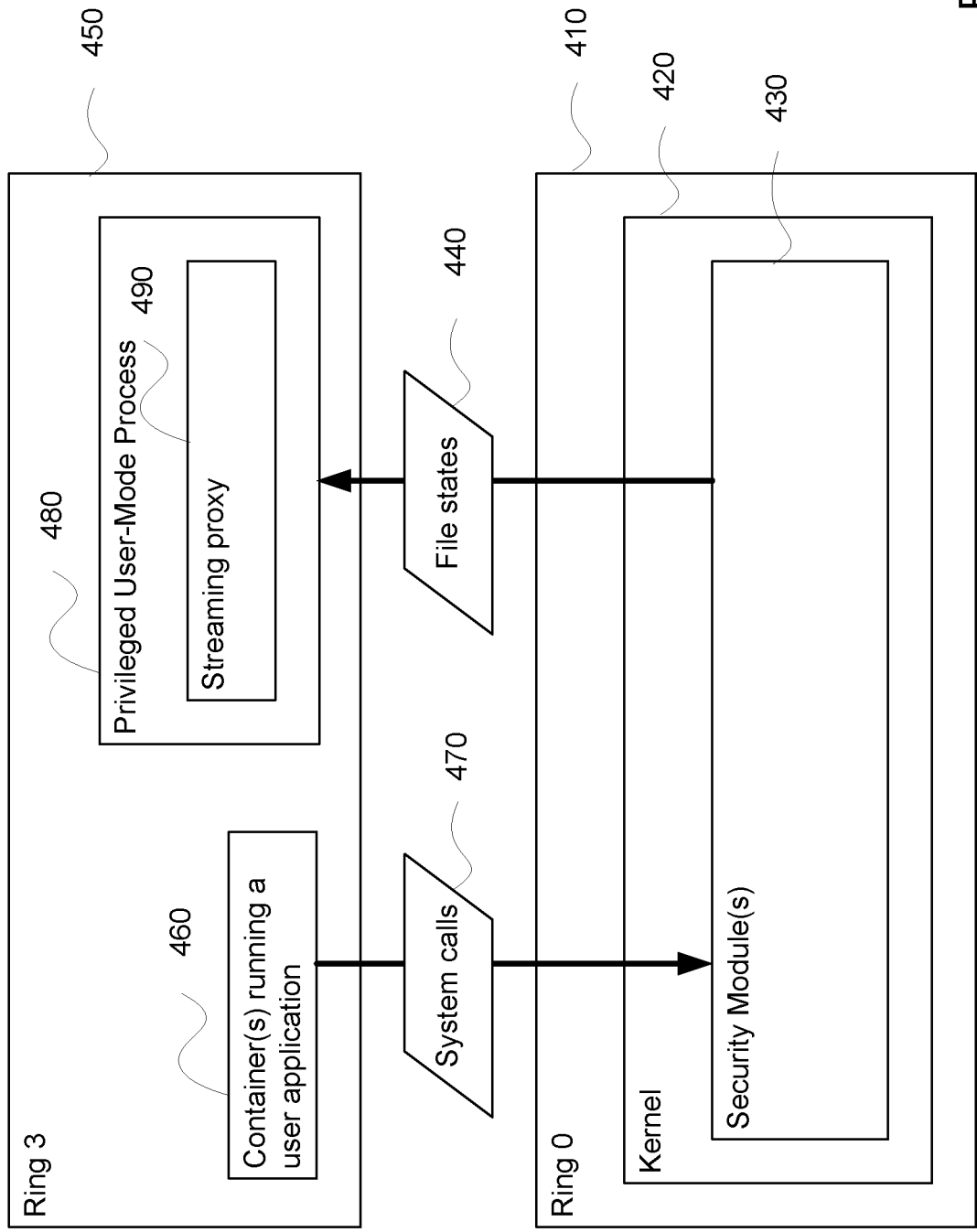
FIG. 4 is a block diagram illustrating an example OS in accordance with aspects of the disclosure.

FIG. 4 shows an example OS 400 configured to output file states of a multi-layer OS file system, such as the multi-layer OS file system 300 shown in FIG. 3. OS 400 can execute a containerized environment such as the containerized environment shown in FIG. 2, and may run on processors 112, 122 of server computers 110, 120, or processors 132, 142 of client computing devices 130, 140 shown in FIG. 1.

Referring to FIG. 4, example OS 400 may have multiple protection rings. For example, code in ring 0 410 may have the most privileges and interact most directly with the physical hardware of a computer, such as the CPU and memory. Ring 0 410 includes kernel 420 of an OS and device drivers. In contrast, code in ring 3 450 may have fewer privileges and may not be configured to directly interact with physical hardware. In this regard, ring 3 450 may include user applications, which may include containers running a user application 460. Although not shown, the OS 400 may include additional protection rings. For example, ring 1 and/or ring 2 may be positioned between ring 0 410 and ring 3 450, where ring 1 may include the device drivers, and ring 2 may include privileged user code.

As shown, in ring 0 410, the kernel 420 may include one or more security modules 430. For example, in order to access memory or a camera, a user application in ring 3 may make a system call to the kernel 420. The system call may request to create a new process, access data in files, etc. As shown, in a containerized environment, a user application 460, which may be run by one or more containers, may make system calls to the security modules 430. The security modules 430 may be configured to determine whether to allow the access requested by the system calls. In this regard, the security modules 430 may make determinations based on rules, such as access control list (ACL), discretionary access control (DAC), etc.

The kernel 420 may be configured and/or modified to output file states 440 of the multi-layer OS file system. Although not all layers of the multi-layer OS file system may be modified by user applications (including containers running the user applications) as described above, all layers of the multi-layer OS file system may remain accessible to the kernel 420. For example, when a system call is received involving file C of FIG. 2, the security modules 430 may identify all layers in which objects corresponding to file C may be found. The security modules 430 may output the file states, for example the file states may indicate that only object 326 corresponding to file C is found in the upper layer 320, and no corresponding objects are found in the lower layer 310. As another example, the file states may indicate that object 314 corresponding to file B can be found in the lower layer 310 and object 324 corresponding to file B can be found in the upper layer 320.

The file states outputted by the kernel 420 may also include other information. For example, the file states for file B may further indicate that object 324 is not empty, but rather includes modifications to object 314. As another example, the file states may indicate whether a file is stored in memory or in hard disk. As still another example, the file states may indicate that objects corresponding to a file in the upper layer 320 are stored in memory, while objects corresponding to the file in the lower layer 310 are stored in a hard disk.

Turning to ring 3 450 of the OS 400, a privileged user-mode process 480 may be provided. For example, the privileged user-mode process may be provided in a privileged container. The privileged user-mode process 480 may receive the file states outputted by the security modules 430. The user-mode process is configured with privilege to protect the security modules 430 and the kernel 420. Non-privileged code, including code in non-privileged containers, may not be allowed to configure or interact with the security modules 430 and the kernel 420. Alternatively, instead of using a privileged user-mode process in ring 3, the kernel 420 may be configured to include code of the privileged user-mode process.

The privileged user-mode process 480 may further include a streaming proxy 490 for outputting the file states received from the kernel 420. For example, the file states may be outputted as events corresponding to various process calls made to the kernel. Since the streaming proxy 490 may only output file states and not other I/O data, traffic through the streaming proxy 490 may be lightweight.

Figure 5:
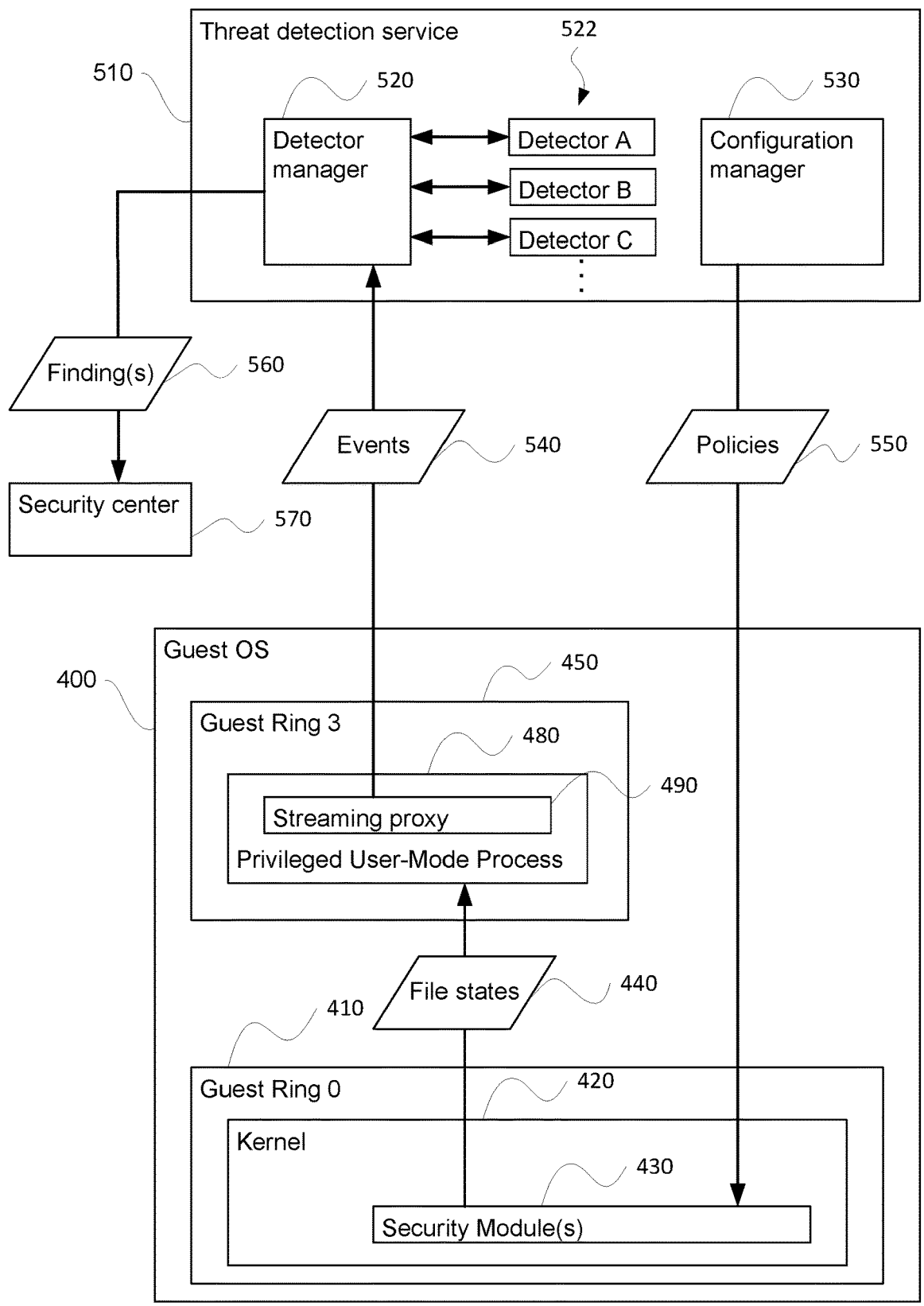
FIG. 5 is a block diagram illustrating an example threat detection system provided in a distributed system in accordance with aspects of the disclosure.

To use the file states of the multi-layer OS file system, a threat detection system may be provided on a distributed system to detect potential threats based on the file states of the multi-layer OS file system. For instance, FIG. 5 shows an example threat detection system 500, which may include the OS 400 as described above, and additional components that receive the file states outputted by the OS 400, and detect potential threats based on the file states. For ease of illustration, containers 460 and system calls 470 in FIG. 4 are omitted from FIG. 5. The OS 400 may be a guest, such as a virtual machine or a hypervisor, hosted on a distributed or cloud computing system, such as system 100 of FIG. 1. Additional components, such as threat detection service 510 and security center 570 shown in FIG. 5, may also be provided in the distributed or cloud computing system, such as system 100 of FIG. 1.

For instance, the threat detection service 510 may include a detector manager 520. The detector manager 520 may be configured to receive events from guest OS's. For example as shown, detector manager 520 may receive events 540 from streaming proxy 490 of privileged user-mode process 480 of guest OS 400. Since threat detection may be made based on file states and may not involve handling and processing I/O data, or profiling disk block allocation maps, the threat detection service 510 may be light weight.

The threat detection service 510 may include a plurality of detectors 522. In this regard, the plurality of detectors 522 may be configured to determine whether events are indicative of a threat. For instance, each detector may be configured to determine whether events for a specific type of file are indicative of a threat. In this regard, each detector may include information on known threats for a specific type of file, and may compare this information to the events of the specific type of file. The type of file may be more generally defined, such as all executable binaries, all library files, all scripts, etc., or more specific, such as a particular type of executable binary, a particular type of library file, a particular type of script, etc. As examples, detector A may be configured for analyzing events involving a specific type of file, such as file A of FIG. 3, detector B may be configured for analyzing events involving a specific type of file such as file B, and detector C may be configured for analyzing events involving a specific type of file such as file C, etc.

Each of the detectors 522 may be configured to analyze the events for a number of suspicious activities. For instance, detector C may analyze events involving file C, and determine that file states in the events indicate that object 326 corresponding to file C exists in the upper layer 320 but that no corresponding object is found in the lower layer 310. Further, detector C may already know that file C is an executory binary, and determine that, since file C was not created at the same time as the base image in the lower layer 310, events involving file C indicate a potential threat.

As another example, detector B may be configured to analyze events involving file B, and determine that file states in the events indicate that object 324 corresponding to file B in the upper layer 320 includes modifications to the corresponding object 314 found in the lower layer 310. Further, detector B may already know that file B is an executory binary, and determine that, since the modification was made after creation of the base image in the lower layer 310, events involving file B indicate a potential threat.

As still another example, detector A may be configured to analyze events involving file A, and determine that file states in the events indicate that object 322 corresponding to file A exists in the upper layer 320 but contains no modifications. Detector A may also know that file A is a library file, and determine that, since no modifications were made in the upper layer 320, events involving file A does not indicate any potential threat.

The detector manager 520 and/or the pluralities of detectors 522 may consider additional factors in determining whether a potential threat exists. For example, an additional factor may be identifying a file which is the cause of, or involved with a process causing, excessive CPU or GPU usage. In this regard, if a process involving a file causes CPU or GPU usage to meet a threshold value, the file may be considered a potential threat. As another example, a file that is only found in memory indicating the file is part of a container, but not backed in hard disk indicating the file is not part of the base image may be another factor indicative of a potential threat.

The detector manager 520 and/or the plurality of detectors 522 may further assign confidence scores to the detected potential threats. For example, a first confidence score may be assigned to an event involving a new file, such as a new executable binary, library file, or script, being added to an upper layer of a multi-layer OS file system. As another example, a second confidence score may be assigned to an event involving modifying a file after a base image is created. As still another example, additional confidence scores may be assigned to one or more additional factors, such as excessive CPU/GPU usage, and/or whether the file is stored in memory and hard disk.

An action may be taken in response to determining that an event is indicative of a potential threat. For example, upon determining that an event is indicative of a potential threat, the detector manager 520, or other component of the threat detection system, may generate findings 560 on the detected potential threats. The findings 560 may include additional information on the detected potential threats. For example, the findings 560 may include a type of threat, such as a suspicious binary execution, a suspicious library file, a suspicious script, or a reverse shell. In some instances, the findings may include additional information such as the hash of the binary associated with the potential threat, the file content itself, and contextual information around the process or the event.

For instance, the detector manager 520 may further analyze the events involving the new executory binary file C, and determine that file C creates a reverse shell, which controls the guest OS 400 running an application to communicate with another machine, such as by sending user data from the application to a listener port of the other machine. As another example, the findings 560 may include a location of the threat, such as an identity for a specific container(s) where a new or modified file such as an executable binary, library file, or script is found or used. For instance, the detector manager 520 may further analyze the events involving the modified executory binary file B, and determine that the modified file B is found or used by a specific container, such as container 221 of FIG. 2. As still another example, the findings 560 may include instructions on how to handle the potential threat.

The threat detection system 500 may additionally include a security center 570, which may be provided as a service on the distributed or cloud computing system 100. The security center 570 may be configured to generate a user interface to output notifications on the potential threats detected by the threat detection system 500. For example, the security center 570 may be configured to receive findings 560 from the detector manager 520 of the threat detection service 510, and generate a user interface to display these findings 560. For example, a user interface may be generated for guest OS 400 displaying potential threats detected for containers running applications for the guest OS 400. The notifications may include information such as type of potential threat, type of file, location of the potential threat such as the identity of instance(s) of container(s) where the potential threats are found. This information may be determined from the additional information including, the content of the file associated with the potential threat, contextual information around the process or the event, the hash value of the binary associated with the potential threat, and other such additional information. The notifications may be in any of a number of formats, such as texts, emails, logs, graphics, audio, haptic feedback, etc.

Additionally or alternatively, the security center 570 may determine whether to take an action, such as generating findings and/or notifying a user, based on a total confidence score for a potential threat. For example, the security center 570 may include one or more notification rules that specify only to notify the user if the total confidence score for a potential threat meets a threshold level. In some instances, the security center 570 may determine whether to take an action based on the additional information. For instance, when the hash of the binary associated with the potential threat matches a known virus an immediate notification may be generated and/or the potential threat may be stopped, paused, or otherwise removed.

As further shown in FIG. 5, the threat detection service 510 may include a configuration manager 530. The configuration manager may be configured to generate policies 550. The policies 550 may specify whether to enable and disable various detection capabilities of security modules in guest OS's. The policies 550 may be general, such as "enable detections for suspicious libraries," "enable detections for suspicious executable binaries," "enable detections for suspicious scripts" or may be more detailed. Additional or alternative policies may be included. In some instances, privacy controls may be provided to allow a user to select which data is collected by the threat detection service. For instance, a user may limit which additional information such as the binary associated with the potential threat, the file content itself, and contextual information around the process or the event should be collected.

By providing the threat detection service 510 and/or security center 570 as dedicated services on a distributed or cloud system. The threat detection service 510 and/or security center 570 may be updated centrally and more quickly with new threat information or detection logic, instead of providing new threat information and/or detection logic to users of the distributed system, who may or may not update immediately. Further, by keeping the threat information and/or detection logic in dedicated services, the threat information and/or detection logic may be protected from inspection by malicious actors.

Nonetheless, though not shown, instead of provided as services on a distributed system, components of the threat detection system 500 may be implemented on the OS that outputs the file states, such as OS 400 of FIG. 4. For example, the OS 400 may be configured to detect a potential threat by determining whether object corresponding to a file, such as an executable binary, library file, or script only exists in the upper layer 320, but not in the lower layer 310. Additionally or alternatively, OS 400 may be configured to detect a potential threat by determining whether modifications are made to an object in the upper layer 320 that corresponds to a file, such as an executable binary, library file, or script. Since threat detection may be made based on file states, where the OS 400 need not handle and process I/O data or profile disk block allocation maps, the process may be light weight. Further, the OS 400 may be configured to generate notifications alerting users of the detected potential threat. For example, the OS 400 may generate texts or graphics regarding the detected potential threats to be displayed on a display, or audio, sounds, or haptics, etc. to alert users.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 6:
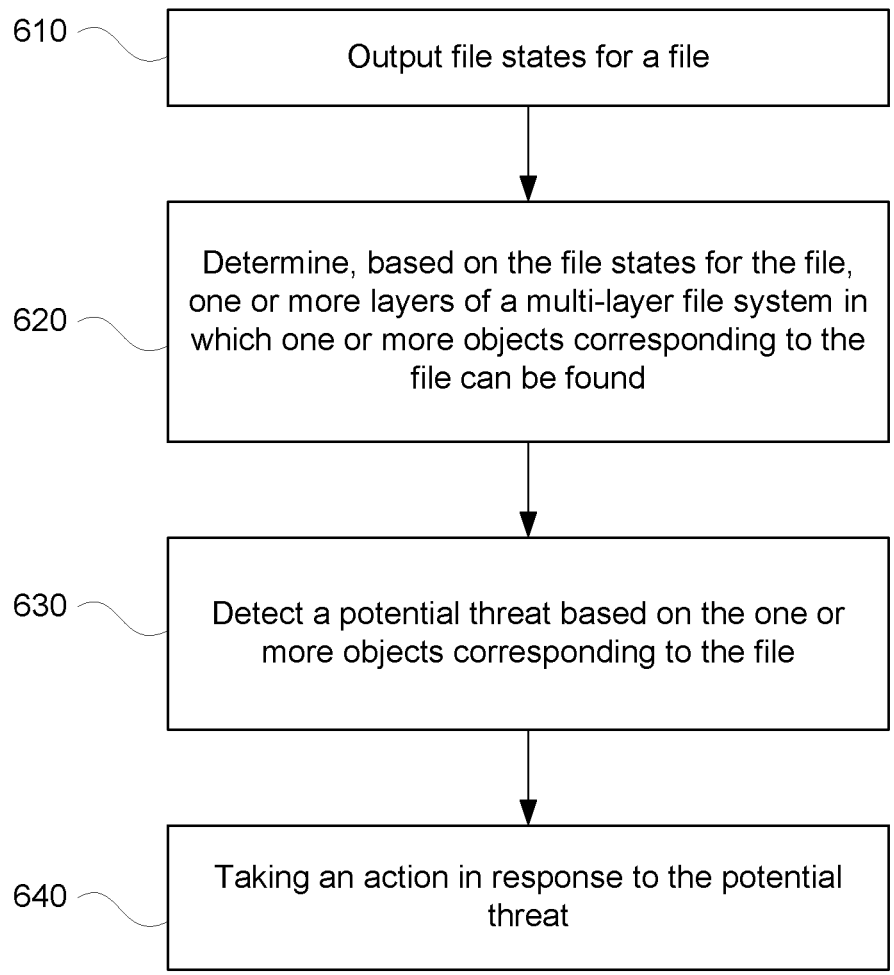
FIG. 6 is a flow diagram in accordance with aspects of the disclosure.

FIG. 6 is a flow diagram illustrating an example method 600 of detecting threats in a multi-layer OS file system running a containerized environment. For instance, operations shown in the flow diagram may be performed by the example systems described herein, such as by one or more processors of the distributed system 100. The system may be running a containerized environment such as shown in FIG. 2 using a multi-layer OS file system such as shown in FIG. 3. The operations may be performed by a threat detection system provided on an OS, such as OS 400 shown in FIG. 4. Alternatively, the operations may be performed by a threat detection system provided on a distributed system, such as threat detection system 500 shown in FIG. 5. Although FIG. 6 illustrates operations for an example method, other methods may include additional and/or alternative operations, including those described above with respect to the example systems. While the operations are illustrated and described in a particular order, it should be understood that the order may be modified and that operations may be added or omitted.

Referring to FIG. 6, in block 610, file states for a file is outputted. For example as shown in FIG. 4, the file states may be outputted by one or more security modules 430 in a kernel 420 of an OS 400. As further shown in FIG. 4, the file states may be sent to a privileged user-mode process 480 of an OS 400. As shown in FIG. 5, the file states may be further sent as events 540 by a streaming proxy 490 to a threat detection service 510 provided on a distributed or cloud computing system.

In block 620, it is determined, based on the file states for the file, one or more layers of a multi-layer file system in which one or more objects corresponding to the file can be found. For example as illustrated by FIG. 3, no object corresponding to file C is found in the base image in the lower layer 310 of the multi-layer OS file system 300. As another example, and as illustrated by FIG. 3, object 324 corresponding to file B is found in the upper layer 320 of the multi-layer OS file system 300 and object 314 corresponding to file B is found in the lower layer 310 of the multi-layer OS file system 300. The file may be executory binaries, library files, scripts, etc.

In block 630, a potential threat is detected based on the one or more objects corresponding to the file. For example, detection of a potential threat may be made based on a determination that none of the one or more objects corresponding to the file is found in the base image. Alternatively or additionally, a potential threat may be detected based on a determination that an object corresponding to the file in a modifiable image in an upper layer of the multi-layer file system includes a modification to an object corresponding to the file in a base image in a lower layer of the multi-layer file system. The detection may be made by the OS 400 of FIG. 4, or made by the threat detection service 510 of FIG. 5. As shown in FIG. 5, findings 560 may be generated for the potential threats, which may include additional information on the potential threats, such as type of threat, location of threat, type of file, etc. As described above, additional factors may be used in detecting potential threats.

In block 640, an action in response to the potential threat is taken. Such an action may include generating and outputting a notification alerting a user of the potential threat and/or generating findings on the potential threat. The action may be taken, for example, by the OS 400 of FIG. 4, or generated by a security center 570 of FIG. 5 as describer herein. Taking an action may be further based on confidence scores as described herein. The notifications may be in any of a number of formats, such as texts, emails, logs, graphics, audio, haptic feedback, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   outputting, by one or more processors, file states for a file;
   determining, by the one or more processors, based on the file states for the file, that one or more layers of a multi-layer file system store one or more objects corresponding to the file;
   determining, by the one or more processors, that an object corresponding to the file, found in a modifiable image in an upper layer of the multi-layer file system, contains modifications to an object corresponding to the file, found in a base image in a lower layer of the multi-layer file system, by comparing the object corresponding to the file found in the modifiable image in the upper layer with the object corresponding to the file found in the base image in the lower layer;
   detecting, by the one or more processors, a potential threat to the multi-layer file system based on determining that the object corresponding to the file found in the modifiable image in the upper layer, contains modifications to the object corresponding to the file found in the base image in the lower layer; and
   taking an action in response to the potential threat.

2. The method of claim 1, further comprising:
   determining that none of the one or more objects corresponding to the file is found in a base image in a lower layer of the multi-layer file system,
   wherein detecting the potential threat is further based on determining that none of the one or more objects corresponding to the file is found in the base image.

3. The method of claim 2, further comprising:
   creating the base image,
   wherein detecting the potential threat is further based on determining that the file states indicate that the file was created after the base image.

4. The method of claim 2, further comprising:
   constructing one or more modifiable images in an upper layer of the multi-layer file system so that the one or more modifiable images contain modifications to the base image made during a runtime of an application,
   wherein detecting the potential threat is further based on determining that the file states indicate that the file was created during the runtime of the application.

5. The method of claim 2, further comprising:
   constructing one or more modifiable images in an upper layer of the multi-layer file system so that the one or more modifiable images contain modifications to the base image made during an instance of a container running an application,
wherein detecting the potential threat is further based on determining that the file states indicate that the file was created during the instance of the container.

6. The method of claim 1, further comprising:
determining whether the file is an executable binary,
wherein detecting the potential threat is further based on determining that the file is an executable binary.

7. The method of claim 1, further comprising:
determining whether the file is a library file,
wherein detecting the potential threat is further based on determining that the file is a library file.

8. The method of claim 1, further comprising:
determining whether the file is a script,
wherein detecting the potential threat is further based on determining that the file is a script.

9. The method of claim 1, further comprising:
determining whether a process involving the file causes a usage of processing resources to meet a threshold value,
wherein detecting the potential threat is further based on determining that the usage of processing resources meeting the threshold value.

10. The method of claim 1, further comprising:
determining whether the file is stored in a hard disk,
wherein detecting the potential threat is further based on the file not being stored in a hard disk.

11. The method of claim 1, wherein taking an action in response to the potential threat includes:
generating a notification based on the potential threat; and
outputting the notification to a user interface.

12. The method of claim 11, further comprising:
assigning a first confidence score to the potential threat based on the determination based on the file states;
assigning one or more additional confidence scores to the potential threat based on one or more additional factors indicative of a threat; and
determining that a total confidence score including the first confidence score and the one or more additional confidence scores meets a threshold level,
wherein generating the notification is further based on the total confidence score meeting the threshold level.

13. The method of claim 11, further comprising:
determining a type of the potential threat,
wherein the notification further includes the type of the potential threat.

14. The method of claim 11, further comprising:
identifying a container in which the potential threat is detected,
wherein the notification further includes an identity of the container.

15. A distributed computing system, comprising:
one or more processors configured to:
provide a guest operating system (OS), the guest OS configured to:
output file states for a file as events;
provide a threat detection service, the threat detection service configured to:
receive the events including the file states;
determine, based on the file states for the file, that one or more layers of a multi-layer file system store one or more objects corresponding to the file;
determine that an object corresponding to the file, found in a modifiable image in an upper layer of the multi-layer file system, contains modifications to an object corresponding to the file, found in a base image in a lower layer of the multi-layer file system, by comparing the object corresponding to the file found in the modifiable image in the upper layer with the object corresponding to the file found in the base image in the lower layer;
detect a potential threat to the multi-layer file system based on determining that the object corresponding to the file found in the modifiable image in the upper layer contains modifications to the object corresponding to the file found in the base image in the lower layer; and
generate findings on the potential threat.

16. The system of claim 15, wherein the threat detection service is further configured to:
determine that none of the one or more objects corresponding to the file is found in a base image in a lower layer of the multi-layer file system,
wherein detecting the potential threat is further based on determining that none of the one or more objects corresponding to the file is found in the base image.

17. The system of claim 15, wherein the threat detection service includes a plurality of detectors, the plurality of detectors each configured to analyze events involving a specific type of file.

18. The system of claim 15, wherein the one or more processors are further configured to:
provide a security center, the security center configured to:
receive, from the threat detection service, the findings on the potential threat; and
generate a notification based on the findings.

19. A method, comprising:
outputting, by one or more processors, file states for a file;
determining, by the one or more processors, based on the file states for the file, that one or more layers of a multi-layer file system store one or more objects corresponding to the file;
determining, by the one or more processors, that an object corresponding to the file, found in a modifiable image in an upper layer of the multi-layer file system, does not have a corresponding object, found in a base image in a lower layer of the multi-layer file system;
detecting, by the one or more processors, a potential threat to the multi-layer file system based on determining that the object corresponding to the file found in the modifiable image in the upper layer does not have a corresponding object found in the base image in the lower layer; and
taking an action in response to the potential threat.

20. The method of claim 1, further comprising retrieving modified portions from the object found in the upper layer and retrieving unmodified portions from the object found in the lower layer.

* * * * *